(12) United States Patent
Tao et al.

(10) Patent No.: US 12,320,944 B1
(45) Date of Patent: Jun. 3, 2025

(54) METHOD FOR CALIBRATING PRESTACK SEISMIC INVERSION USING FULLY CONNECTED NEURAL NETWORKS

(71) Applicant: CHINA PETROLEUM & CHEMICAL CORPORATION, Beijing (CN)

(72) Inventors: Yi Tao, Houston, TX (US); Jianhua Yu, Houston, TX (US); Jianxing Hu, Houston, TX (US); Yequan Chen, Houston, TX (US)

(73) Assignee: CHINA PETROLEUM & CHEMICAL CORPORATION, Beijing (CN)

(*) Notice: Subject to any disclaimer, the term of this patent is extended or adjusted under 35 U.S.C. 154(b) by 52 days.

(21) Appl. No.: 18/530,165

(22) Filed: Dec. 5, 2023

(51) Int. Cl.
*G01V 13/00* (2006.01)
*G01V 1/28* (2006.01)
*G01V 1/30* (2006.01)

(52) U.S. Cl.
CPC .............. *G01V 13/00* (2013.01); *G01V 1/282* (2013.01); *G01V 1/306* (2013.01)

(58) Field of Classification Search
CPC ......... G01V 1/306; G01V 1/282; G01V 13/00
See application file for complete search history.

(56) References Cited

U.S. PATENT DOCUMENTS

| | | | | |
|---|---|---|---|---|
| 5,583,825 | A * | 12/1996 | Carrazzone | G01V 1/288 367/83 |
| 11,493,658 | B2 * | 11/2022 | Xia | G01V 1/50 |
| 2016/0116619 | A1 | 4/2016 | Leiceaga | |
| 2020/0301036 | A1 | 9/2020 | Ramfjord et al. | |
| 2022/0099855 | A1 | 3/2022 | Li et al. | |
| 2023/0314649 | A1 | 10/2023 | Xu et al. | |
| 2025/0075597 | A1 * | 3/2025 | Alsaleh | C09K 8/52 |

FOREIGN PATENT DOCUMENTS

CN 110727031 B * 4/2021 ............. G01V 1/303

OTHER PUBLICATIONS

English translation for CN-110727031-B is included (Year: 2021).*
Berkhout, "The Seismic Method in the Search for Oil and Gas: Current Technique and Future Development", Aug. 1986, IEEE Publication, pp. 1133-1163 (Year: 1986).*
Brian Russell et al., "Fluid-property discrimination with AVO: A Biot-Gassmann perspective", CREWES Research Report; vol. 13; Year: 2001; pp. 403-411.

* cited by examiner

*Primary Examiner* — Elias Desta
(74) *Attorney, Agent, or Firm* — NKL Law; Allen Xue

(57) ABSTRACT

An approach for calibrating prestack seismic inversion is provided. This method includes selecting various features from inverted elastic properties to generate reservoir properties; fully connected neural network models are used to learn the mapping between the features and ground truth data at well locations; and the prediction is applied to generate one or more final models for the reservoir characterization of the whole survey region.

11 Claims, 14 Drawing Sheets

METHOD FOR CALIBRATING PRESTACK SEISMIC INVERSION USING FULLY CONNECTED NEURAL NETWORKS

TECHNICAL FIELD

The present disclosure relates generally to the field of seismic exploration and geophysical reservoir characterization. More particularly, this invention is a method of calibrating prestack seismic inversion, using fully connected neural networks.

BACKGROUND OF THE INVENTION

Seismic inversion is widely used in the oil and gas industry to predict underground geological features and properties that are not directly observable. It involves the seismic survey to gather seismic data and well log data, mathematical and computational analysis of seismic data and well log data to derive information about the lithology, fluid content, and other physical properties. Prestack inversion uses seismic data before it is stacked (a process that combines and averages the data to improve signal-to-noise ratios). This could take advantage of amplitude versus offset (AVO) or amplitude variation versus angle (AVA) effects, allowing for the extraction of more comprehensive geological information about the subsurface than poststack inversion.

Seismic data covers a wide area and provides information about subsurface structures over a large volume; however, it provides relatively lower vertical resolution compared to well log data. Well log data, on the other hand, offers high vertical resolution and accurate measurements of rock and fluid properties at specific depths but lacks spatial coverage. Prestack seismic inversion is trying to combine both seismic data and well log data to produce high resolution reservoir properties with wide spatial coverages.

Challenges arise when applying prestack inversion to complex environments where high accuracy and high vertical resolution are required. One challenge is that some properties such as density are only sensitive to large offset seismic data, which are generally noisier and less reliable than near offset data. Another challenge is that seismic data and wavelet is band limited, resulting in a loss of high-frequency details, which are essential for resolving fine geological features, thin beds, and small-scale reservoir heterogeneities. A third challenge is that some geological properties, such as fluid indictors, typically are not directly obtained from inversion, but involve combination of P-wave velocity, S-wave velocity, and density. The inherent uncertainties associated with each of these parameters can compound, potentially resulting in greater overall uncertainties than those associated with any individual parameter in isolation. Accordingly, it is important to address the challenges to improve the accuracy and resolution of prestack seismic inversion to improve lithology identification, fluid discrimination, and reservoir characterization in the field of seismic exploration and reservoir characterization.

SUMMARY

The present disclosure, in one of its embodiments, provides a method for calibrating prestack seismic inversion results using a fully connected neural network to produce more accurate and higher-resolution predictions of reservoir properties for the entire seismic survey region. This method encompasses the following steps: obtaining seismic data and well log data; deriving seismic horizons, estimated wavelet, and initial geological model; obtaining prestack inverted geological models by combining seismic data, well log data, horizons, estimated wavelet, and initial geological model; calculating geological attributes of the target reservoir by combining inverted geological models; generating features from the target reservoir attributes and optionally from other geological attributes and data types; selecting the number of layers and parameters for each layer for a neural network to optimize the calibration process; training the neural network model and rigorously evaluating its results at well locations and across the entire survey region; applying calibrated model's predictions for the entire survey region and optionally generating additional volumes of rock and fluid properties.

In the method, examples of prestack seismic inversion approaches may include elastic wave equation inversion, model-based inversion, stochastic inversion, and sparse spike inversion.

In the method, inverted geological models consist of three terms and are parameterized as P-wave velocity, S-wave velocity, and density, or as P-wave impedance, S-wave impedance, and density, or as bulk modulus, shear modulus, and density.

In the method, features extracted from target geological attributes include amplitude, amplitude envelope, amplitude-weighted frequency, amplitude-weighted phase, average frequency, apparent polarity, cosine instantaneous phase, derivative of seismic data, derivative instantaneous amplitude, dominant frequency, instantaneous frequency, instantaneous phase, and integrated absolute amplitude.

In the method, examples of other attributes and data types comprise initial model, inline location, crossline location, two-way travel time, depth, horizons, topography, and tidal data.

In the method, a fully connected neural network is selected and trained in a regression architecture, where the ground truth data has a set of continuous measurements.

In the method, target reservoir geological attributes include P-wave velocity, S-wave velocity, density, Poisson impedance, P-wave to S-wave velocity ratio $v_p/v_s$ and fluid indicator(s).

BRIEF DESCRIPTION OF THE DRAWINGS

The teachings of the present disclosure can be readily understood by considering the following detailed description in conjunction with the accompanying drawings.

DETAILED DESCRIPTION

Figure 1:
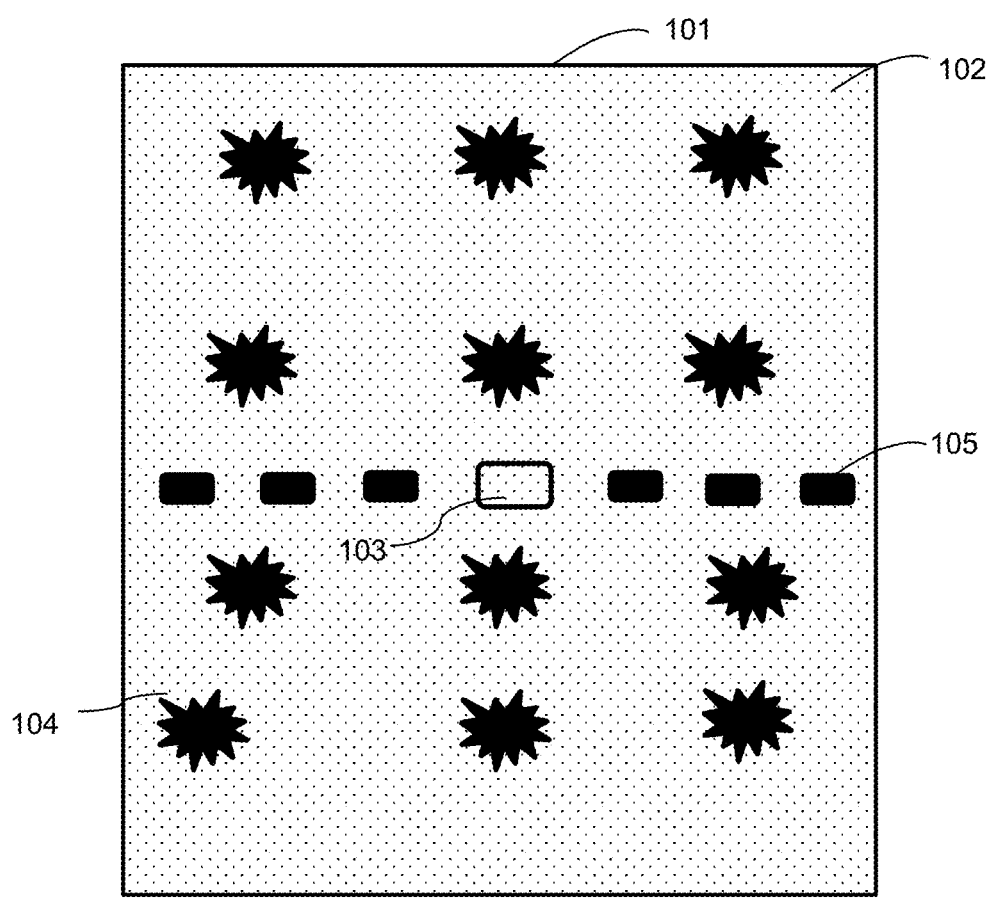
FIG. 1 is a schematic diagram illustrating a top view of a survey region with the various points of incidence of seismic sources according to an embodiment in this disclosure.

Reference will now be made in detail to embodiments of the present disclosure, examples of which are illustrated in the accompanying drawings. It is noted that wherever practicable, similar or like reference numbers may be used in the drawings and may indicate similar or like elements.

The drawings depict embodiments of the present disclosure for purposes of illustration only. One skilled in the art would readily recognize from the following description that alternative embodiments exist without departing from the general principles of the disclosure.

Throughout the specification, the terms approach(es), method(s), and technology are used interchangeably and have the same meaning.

Throughout the specification, the terms loss function, cost function and error function are used interchangeably and have the same meaning.

Throughout the specification, the terms fluid factor and fluid indictor have the same meaning.

Prestack seismic inversion could be achieved by iteratively updating the geological model and generating synthetic seismograms to match with observed seismic data. The forward problem could be formulated as the following problem:

$$d = G(m), \quad (1)$$

wherein d denotes observed seismic data at different offsets or angles, m denotes the elastic model (P-wave velocity $v_p$, S-wave velocity $v_s$, or formation density $\rho$), which could be directly measured as the ground truth data at well locations, G is the forward modeling operator, which could be simplified as a linearized operator or could be non-linear if an elastic wave propagator is used.

An example of a general cost function is quadratic cost function. Mathematically, the quadratic cost function £ for seismic inversion could be formulated as:

$$£ = \|G(m) - d\|^2. \quad (2)$$

Several constraints can affect the accuracy and vertical resolution of the inverted results. One factor is that seismic data recorded at the surface is often attenuated, with deeper intervals attenuating much faster than shallower intervals, resulting in band-limited seismic data at reservoir targets.

Another factor is that wavelets are typically required in seismic inversion. Wavelets can be non-stationary, meaning they can vary not only vertically in depth or time but also in space, making it challenging to estimate them accurately. Additionally, in prestack seismic inversion using the linearized Zoeppritz equation or even the full wave elastic equation, density is only sensitive to high-angle reflections, which can be difficult to obtain.

To differentiate between various lithologies, rock types, or to identify the presence and distribution of fluids within the reservoir, typically, an attribute is selected through cross-plotting with lithologies or fluid contents. This attribute could directly utilize inverted elastic parameters. However, more often, it involves constructing a new parameter by combining one or more parameters from P-wave velocity, S-wave velocity, and density. In an exemplary embodiment used is a fluid factor based on the following formula (Russell B. et al., 2003, Fluid property discrimination with AVO: A Biot-Gassmann perspective. Geophysics, 68 (1): 29-39):

$$f = \rho v_p^2 - C \rho v_s^2, \quad (3)$$

where f denotes the fluid factor, $\rho$ denotes density, C is a constant that relates to $v_p/v_s$ and C=2.25 is used as an example.

Equation 3 suggests that if the inversion is parameterized with P-wave velocity, S-wave velocity, and density, the fluid factor is obtained indirectly. The error in the fluid factor can be approximated as (parameterization by P-impedance, S-impedance, and density, or by bulk modulus, shear modulus, and density would yield similar approximated errors):

$$\Delta f = 2\Delta \rho \Delta v_p + 2C\Delta \rho \Delta v_s. \quad (4)$$

Equation 4 suggests that error of target attribute such as fluid factor could potentially be larger than any single parameter (e.g., $v_p$, $v_s$, or $\rho$) directly obtained from prestack seismic inversion.

To alleviate the physical and numerical limitations associated with prestack seismic inversion, a method that utilizes fully connected neural networks is provided, in which the inverted results are employed as the foundation and input for neural network training and testing. Fully connected neural networks have the capability to model highly non-linear and complex relationships within the data without relying on physical assumptions and limitations. They efficiently integrate data from various sources, including seismic data, well logs, horizons, and more. These networks adaptively fuse these diverse datasets, resulting in a comprehensive subsurface characterization that enhances the quality and reliability of predictions.

Mathematically, the quadratic loss for a fully connected neural network could be written as:

$$£ = \|\hat{y}(\theta) - y\|^2, \quad (5)$$

where $\theta = (W_1, W_2, W_3, W_4, \ldots)$ is the weights of the neural networks, prediction $\hat{y}(\theta)$ is a function of these weights. Equation 5 takes a form similar to Equation 2; the difference lies in the fact that in Equation 2, a forward modeling operator G based on physical assumptions is utilized. In contrast, in Equation 5, customized layers and parameters of neural networks are used to learn the mapping between different datasets and generate predicted data.

FIGS. 1-14 illustrate the apparatus, process, method, and results of the current disclosures. In particular, FIGS. 1-4 show exemplary embodiments of methods, apparatuses, and mediums for obtaining and storing the seismic data, which is processed to generate the one or more high resolution geological models for high resolution images for lithology identification, fluid discrimination, and reservoir characterization of complex subsurface structures of a survey region. The survey region may be subsurface structures under land or subsurface structures under the sea.

FIG. 1 is a schematic diagram illustrating a top view of a survey region with the various points of incidence of seismic sources according to an embodiment. More specifically, FIG. 1 illustrates a seismic survey region (survey region) 101, which is a land-based region denoted by reference numeral 102. Reference number 102 denotes the top earth formation of the land-based region 102. Persons of ordinary skill in the art, will recognize that seismic survey regions produce detailed images of local geology to determine the location and size of possible hydrocarbon (oil and gas) reservoirs, and therefore a well location 103. In these survey regions, seismic waves bounce off underground rock formations during emissions from one or more seismic sources at various points of incidence 104. A blast is an example of a seismic source generated by seismic equipment. The seismic waves that reflect back to the surface are captured by seismic data recording sensors 105, transmitted by one or more data transmission systems (frequently wirelessly) from the seismic data recording sensors 105, and stored for later processing and analysis by a high-performance computing system. Although this example shows a top earth formation of a land-based region 102, it is understood that this is only an example, and the methods and system may also be applied to a survey region at the bottom of an ocean.

Figure 2:
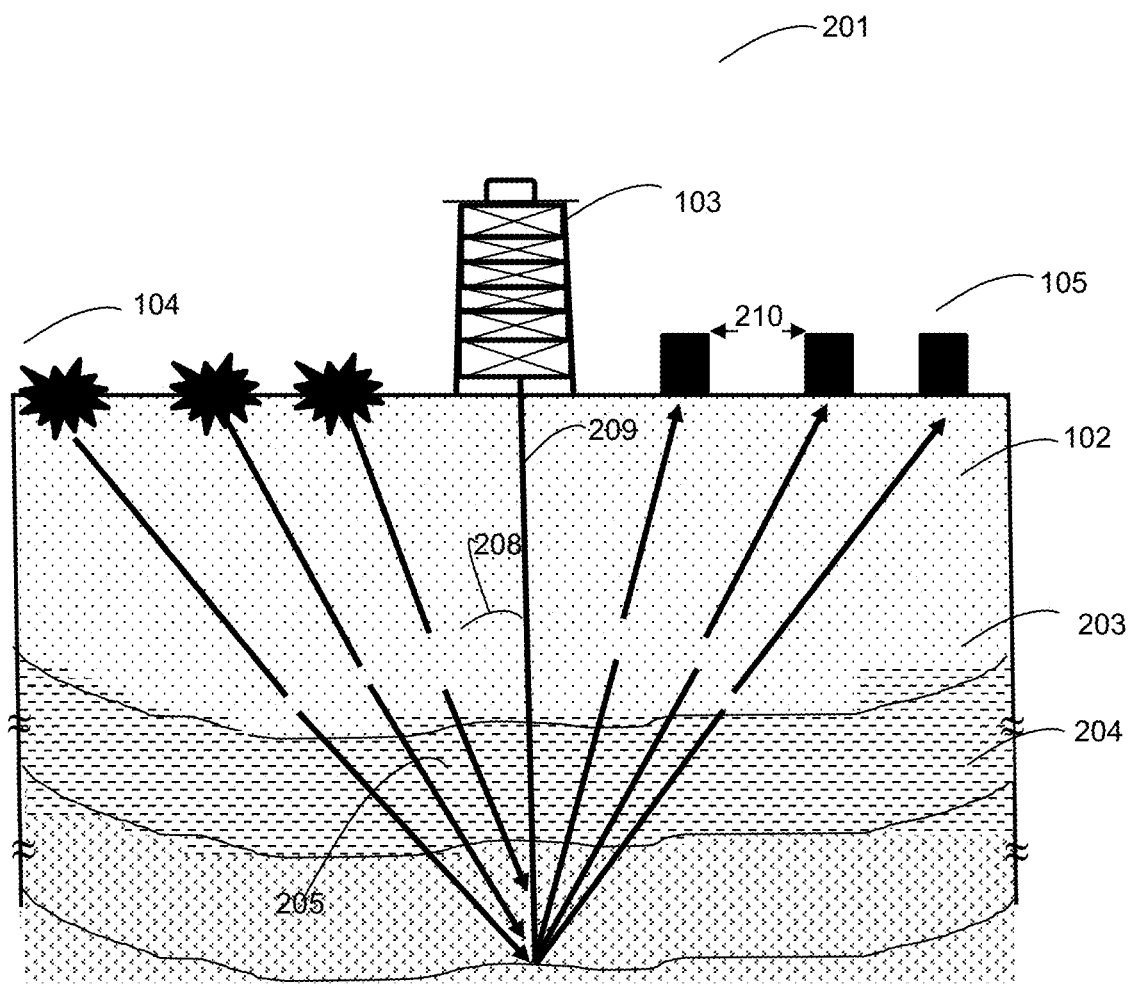
FIG. 2 is a schematic diagram illustrating a cross-sectional view of an environment with points of incidence of seismic sources, seismic data recording sensors, a well location, a wellbore, the various transmission rays, and the various angles of incidence, according to an embodiment.

FIG. 2 is a schematic diagram illustrating a cross-sectional view of a seismic survey region 101 in FIG. 1 with points of incidence of seismic sources, seismic data recording sensors (seismic receivers), a well location, a wellbore, the various transmission rays, and the various angles of incidence, according to an embodiment. More specifically, in FIG. 2 a cross-sectional view of a portion of the earth over the seismic survey region is denoted by reference numeral 201, showing different types of earth formations denoted by reference numerals 102, 203, and 204. Although the seismic survey region is based on land in this example, it is understood that this is only an example and that the methods and system may also be applied to a survey region at the bottom of an ocean. FIG. 2 illustrates a common midpoint-style gather, where seismic data are sorted by surface geometry to approximate a single reflection point in the earth. The survey seismic data may also be referred to as traces, gathers, or image gathers. In this example in FIG. 2, data from one or more shots or blasts and receivers may be combined into a single image gather or used individually depending upon the type of analysis to be performed.

As shown on FIG. 2, one or more shots or blasts represents seismic sources located at various points of incidence or stations denoted by reference numeral 104 at the surface of the Earth at which one or more seismic sources are activated. Seismic energy or seismic sources from multiple points of incidence 104, will be reflected from the interface between the different earth formations. These reflections will be captured by multiple seismic data recording sensors 105, each of which will be placed at different location offsets 210 from each other, and the well 103. Because all points of incidences 104, and all seismic data recording sensors 105 are placed at different offsets 210, the survey seismic data or traces, also known in the art as gathers or image gathers, will be recorded at various angles of incidence represented by 208. The points of incidence 104 generate downward transmission rays 205, in the earth that are captured by their upward transmission reflection through the seismic data recording sensors 105. Well location 103, in this example, is illustrated with an existing drilled well attached to a wellbore, 209, along which multiple measurements are obtained using techniques known in the art. This wellbore 209, is used to obtain well log data, which may include P-wave velocity, S-wave velocity, density, among others. Other sensors, not depicted in FIG. 2, may be placed within the survey region to capture seismic data. Seismic data may be used to examine the dependence of amplitude, signal-to-noise, move-out, frequency content, phase, and other seismic attributes, on incidence angles 208, offset measurements 210, azimuth, and other geometric attributes that are important for data processing and imaging of a seismic survey region.

Figure 3:
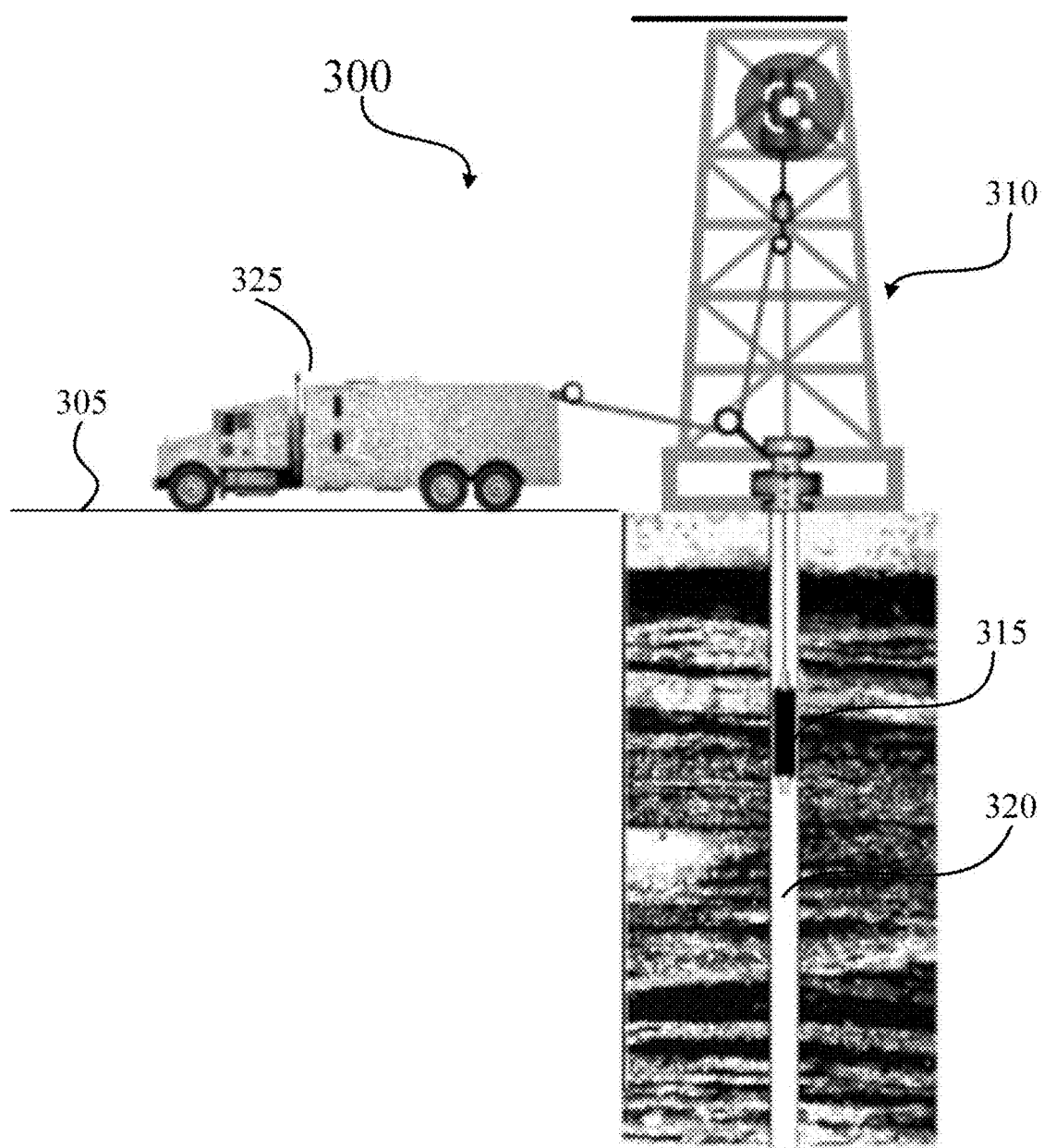
FIG. 3 is a schematic diagram illustrating a cross-sectional view of an environment with a wellbore and a well logging tool including one or more sonic generators and one or more well log data recording sensors according to an embodiment.

FIG. 3 is schematic diagram illustrating a cross-sectional view of a seismic survey region with a wellbore and well logging tool including one or more sonic generator and one or more well log data recording sensors according to an embodiment. A sonic generator is an example of equipment to produce one or more sonic waves (sound waves). A sonic generator may be referred to as a sonic source because the sonic generator produces or generates one or more sonic waves (sound waves) which are also referred to as seismic waves. The one or more well log data recording sensors are examples of one or more seismic data recording sensors (seismic receivers or seismic data recorders) and may be the same seismic data recording sensors as seismic data recording sensors 105. In embodiments of the present disclosure, oil and/or gas production is discontinued in order to generate seismic waves and record seismic data including reflections of the seismic waves moving through the subsurface of one or more earth formations in the seismic survey region.

FIG. 3 also shows an oil drilling system 300 on land 305 including a drilling rig 310. The drilling rig 310 supports the lowering of a well logging tool 315 into a wellbore 320. The well logging tool 315 may include one or more sonic generators (sonic sources) to generate one or more sound waves, which are transmitted into one or more earth formations to generate reflections or reflection waves in the one or more earth formations. Although this example shows one or more earth formations of a land-based survey region, it is understood that this is only an example and that the methods and systems may also be applied to a survey region at the surface or bottom of a body of water such as an ocean. The well logging tool 315 also includes one or more well log data recording sensors. As discussed above, the one or more well log data recording sensors receive and record well log data, which includes reflection data received by the one or more well log data recording sensors in response to the sound waves transmitted into one or more earth formations by the one or more sonic generators. The well log data is an example of seismic data. The well log data may include compression wave velocity or P-wave velocity ($v_p$), shear wave velocity ($v_s$), and density, which is an indicator of porosity. This well logging process to record well log data may also be referred to as sonic logging. A vehicle 325 may be coupled to the well logging tool 315 to assist in the lowering and raising of the well logging tool 315 as well as communicating with the well logging tool 315 to obtain well log data. Alternatively, in methods and systems for a survey region at the surface or bottom of a body of water such as an ocean, another device or system may use to assist in the lowering or raising of the well logging tool 315 as well as communicating with the well logging tool 315 to obtain well log data.

Figure 4:
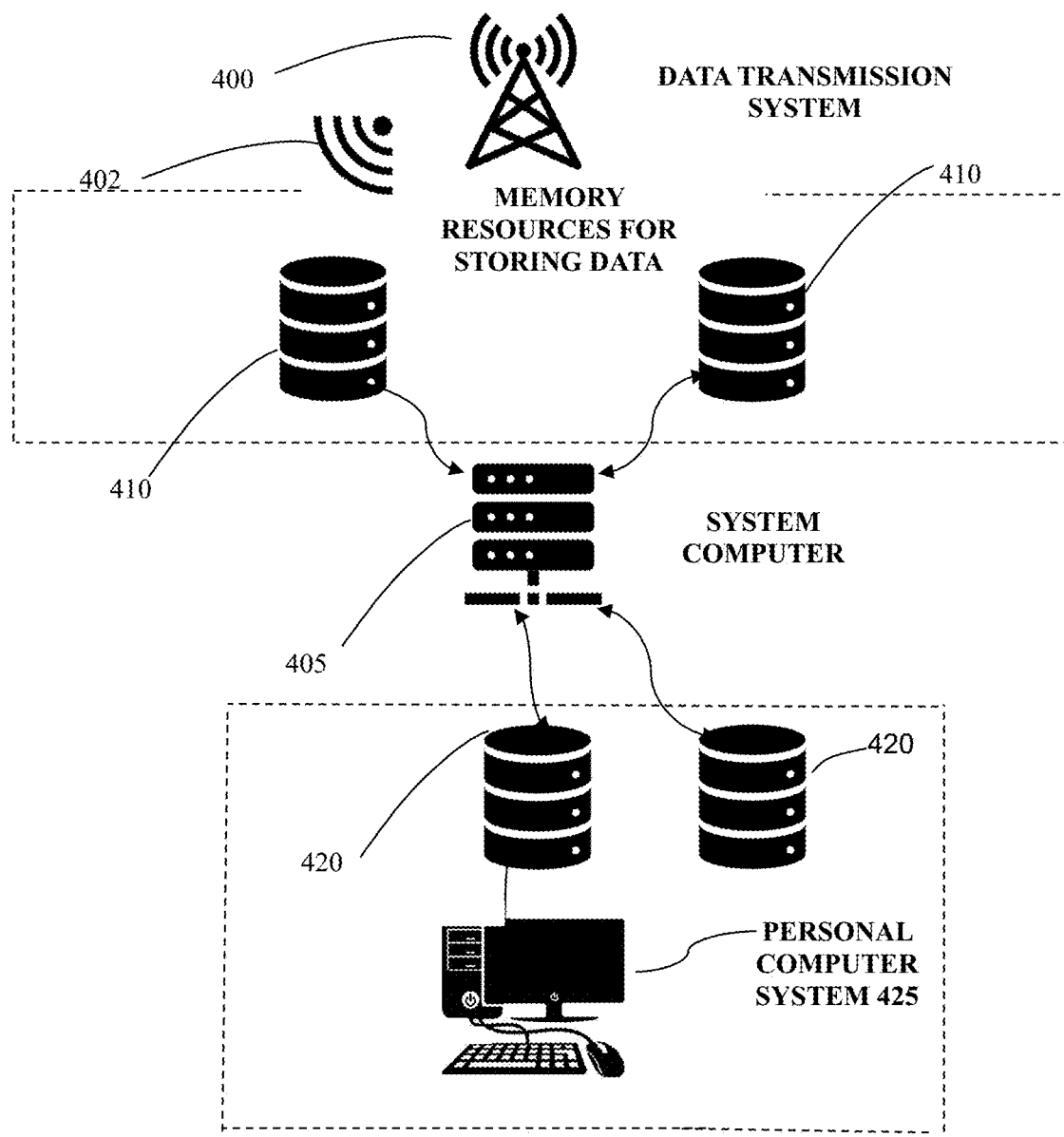
FIG. 4 is a schematic diagram illustrating a high-performance computing system according to an embodiment.

FIG. 4 is a schematic diagram illustrating a high-performance computer system according to an embodiment, which receives (frequently wirelessly) seismic data regarding seismic waves from the seismic data recording sensors 105 in FIGS. 1 and 2 and/or the seismic data recording sensors in FIG. 3, which are also referred to as well log data recording sensors in FIG. 3. The high-performance computer system in FIG. 4 stores the seismic data in at least one memory for later processing and analysis by computer implemented methods and apparatuses of one or more embodiments. The analyzed or processed seismic data may be accessed by a personal computer system. More specifically, FIG. 4 shows a data transmission system 400 for wirelessly transmitting seismic data from seismic data recording sensors to a system computer 405 coupled to one or more storage devices 410 to store the seismic data in databases. The data transmission system may also transmit wirelessly seismic data from seismic data recording sensors 105 directly to one or more storage devices 410 to store the seismic data in databases, which may be accessed by system computer 405. The wireless transmission is denoted by reference numeral 402. The one or more storage devices 410 may also store other computer software instructions or programs to implement apparatuses and methods described in embodiments. The system computer 405 may be coupled (e.g., wirelessly coupled) to one or more output storage devices 420, which may receive the results of computer implemented processes or methods performed by the system computer 405. A personal computer 425 may be coupled (e.g., wirelessly coupled) to one or more output storage devices 420 and/or to the computer system 405 so that a user may utilize a user interface of the personal computer 425 to input information or obtain the results of the computer implemented processor methods performed by the system computer 405. The one or more storage devices 420 may also store other computer software instructions or programs to implement apparatuses and methods described in embodiments.

A user interface of the personal computer 425 may include, for example, one or more of a keyboard, a mouse, a joystick, a button, a switch, an electronic pen or stylus, a gesture recognition sensor (e.g., to recognize gestures of a user including movements of a body part), an input seismic device or voice recognition sensor (e.g., a microphone to receive a voice command), an output seismic device (e.g., a speaker), a track ball, a remote controller, a portable (e.g., a cellular or smart) phone, a tablet PC, a pedal or footswitch, a virtual-reality device, and so on. The user interface may further include a haptic device to provide haptic feedback to a user. The user interface may also include a touchscreen, for example. In addition, a personal computer 425 may be a desktop, a laptop, a tablet, a mobile phone or any other personal computing system.

Processes, functions, methods, and/or computer software instructions or programs in apparatuses and methods described in embodiments herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

The one or more databases may include a collection of data and supporting data structures which may be stored, for example, in the one or more storage devices 410 and 420. For example, the one or more storage devices 410 and 420 may be embodied in one or more non-transitory computer readable storage media, such as a nonvolatile memory device, such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, or combinations thereof. However, examples of the storage devices 410 and 420 are not limited to the above description, and the storage may be realized by other various devices and structures as would be understood by those skilled in the art.

Figure 5:
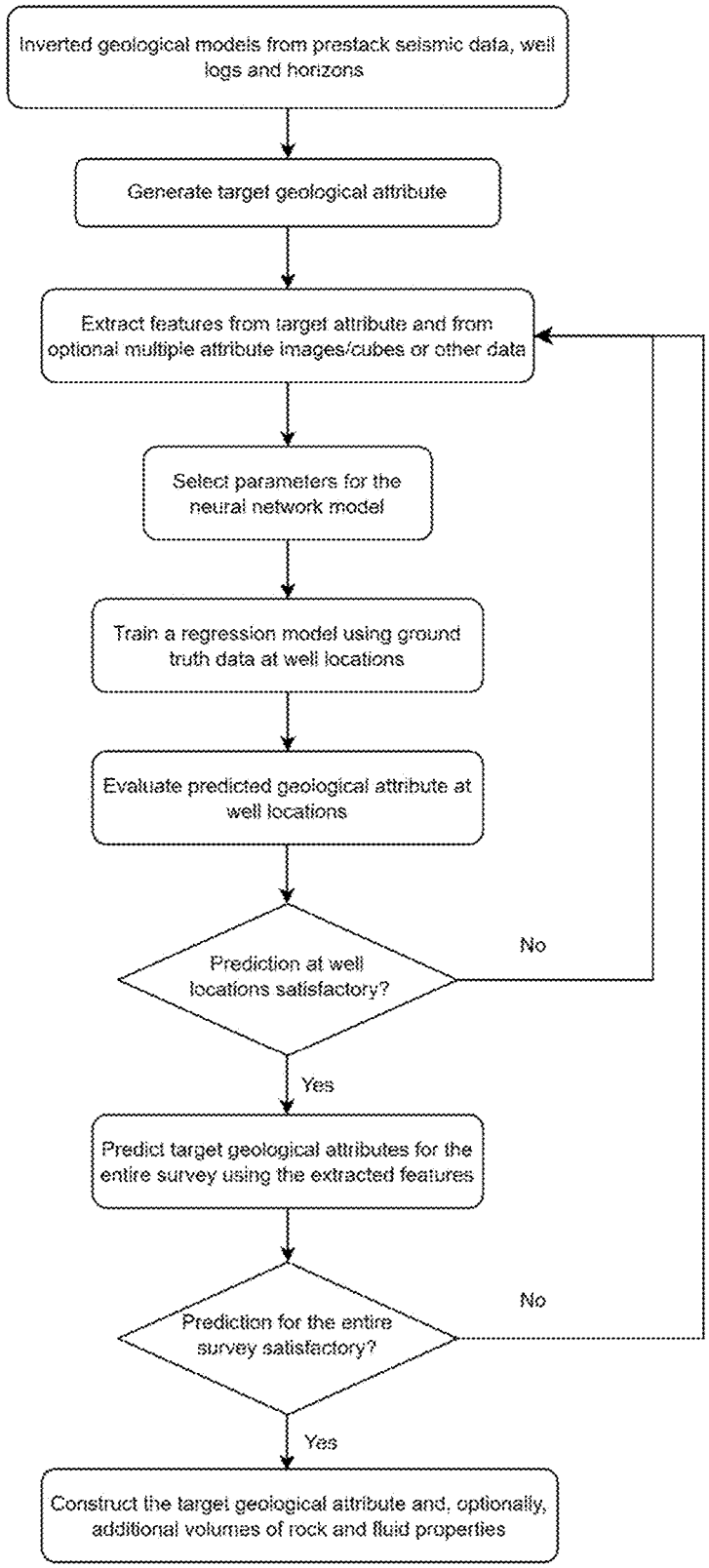
FIG. 5 is a flowchart illustrating the method of calibrating prestack inversion results using fully connected neural networks, according to an embodiment of the present disclosure.

Referring to FIG. 5, a workflow diagram illustrates the processes of training and predicting target reservoir attributes with a fully connected neural network. First, prestack seismic data, well log data, and seismic horizons are inverted to generate target geological attributes. Features are extracted from the target attributes and optionally from other images and data cube or historical data. During the training stage, various optional features could be utilized. These features include, but are not limited to, inverted elastic parameters and derived attributes from these inversions, horizons, spatial locations, and two-way travel time. High-resolution well log data, along with optional augmented synthetic well log data, is employed as the ground truth data for the training. The predicted geological attributes are evaluated with geological attributes obtained at the well locations. If the predicated attributes match those obtained at the well locations according to predetermined criteria, the target geological attributes can be constructed using the predicted attributes as well as, optionally, additional volumes of rock and fluid properties. To produce high-fidelity results that can be used to determine the location and size of potential hydrocarbon reservoirs, model performance is typically predicted and evaluated within the seismic survey region. The criteria for model evaluation may include the R2 score, Pearson correlation coefficient, root mean square error (RMSE), mean absolute error (MAE) at well locations; and vertical resolution, lateral continuity, and feedback from human experts for the entire survey.

Figure 6:
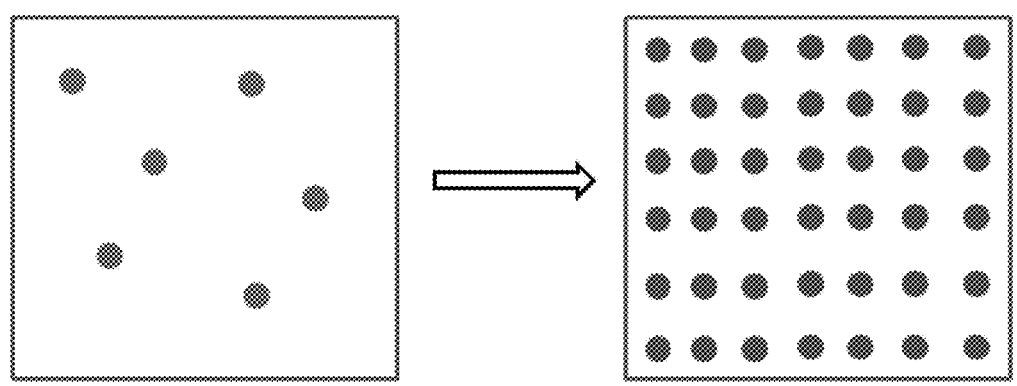
FIG. 6 is a schematic diagram illustrating a map view of an environment with training data on the left and predictions of the survey region on the right.

Referring now to FIG. 6, a schematic diagram illustrates a top view of the ground truth data (left panel) and the entire survey region (right panel). Ground truth data, derived from well logs and synthetic well logs, tends to be sparse and irregularly distributed across the survey region. In contrast, data points for the seismic survey are regularly spaced and evenly distributed. This pattern holds true for both land and marine oil fields, as well as for both the exploration and development stages of the field.

Figure 7:
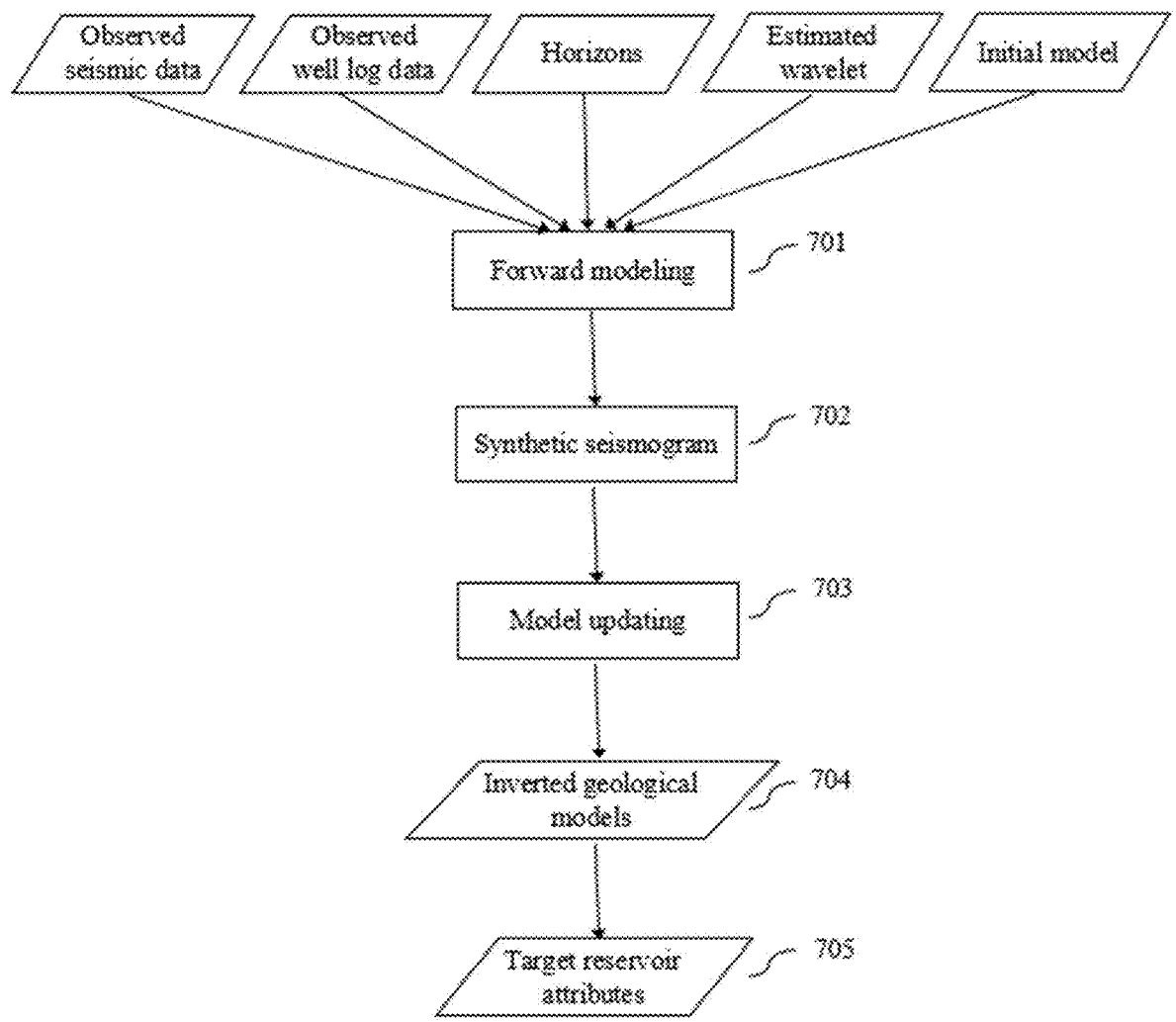
FIG. 7 is a flowchart illustrating the process of predicting target reservoir attributes using a prestack seismic inversion.

FIG. 7 is a flowchart illustrating the process of predicting target reservoir attributes using a prestack seismic inversion. The observed seismic data are gathered by seismic survey and the well log data are collected using well log operations at one or more well locations, as illustrated in FIGS. 1-4. Horizons are specific geological events that are characterized by distinct seismic responses. A horizon is obtained through interpretating geological interfaces in seismic data. After seismic data is processed, key seismic events representing subsurface changes are interpreted employing both manual and automated picking methods. Quality control checks, integration with other geological data, and iterative refinement contribute to accurate horizon identification.

Seismic wavelets are derived to represent a waveform that characterizes the seismic data. They are estimated through techniques such as deconvolution, least square matching from synthetic seismic traces, etc.

The initial model for seismic inversion can be derived from well log data, rock physics models, regional geological knowledge, and insights from previous studies. Some interpolation methods such as cokriging interpolation is used to combine well log data and seismic data to refine the estimation of initial model.

In operation 701—forward modeling, the seismic data, well log data, seismic horizons, estimated wavelet and initial model are processed through one of the prestack seismic inversion approaches to generate the geological models, e.g., P-wave velocity, S-wave velocity, and density, for the entire survey region. Examples of prestack seismic inversion approaches may include elastic wave equation inversion, model-based inversion, stochastic inversion, and sparse spike inversion.

In operation 702, synthetic seismogram is generated using a linearized equation (e.g., the Zoeppritz equation), or non-linear full wave elastic equation based on P-wave velocity, S-wave velocity, and density. Operation 703—model updating—involves comparing the data residual between seismic data and synthetic seismogram, iteratively adjusting the model until the data residual is within accepted criteria or the number of iterations exceed the predefined maximum number of iterations.

In operation 705, target reservoir attributes such as P-wave velocity, S-wave velocity, density, Poisson impedance, P-wave to S-wave velocity ratio and fluid indicator are calculated by combining the geological models obtained in 704.

Figure 8:
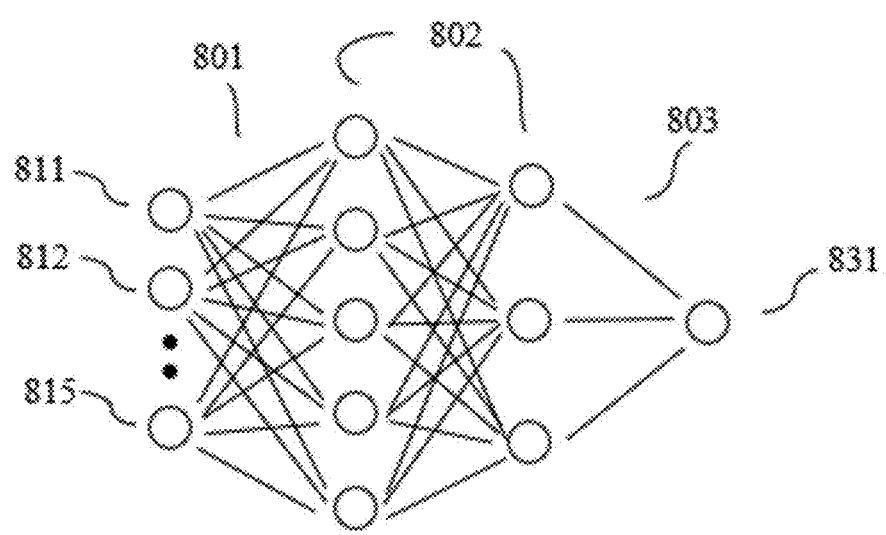
FIG. 8 shows a fully connected neural network.

FIG. 8 illustrates a fully connected neural network having an input layer 801, a middle layer 802, and an output layer 803. The input layer 801 includes inputs 811 to 815 which can be any combination of the seismic features. The middle layer 802 is hidden, which can be one or more layers. The processors (neurons) in each middle layer can be regression architectures. The outputs from processors (neurons) in a preceding layer serve as the inputs to the following layer. The final output 831 from the output layer 803 is one of the geological attributes to be predicted.

When training the neural network, ground truth data at well locations are utilized. For example, to predict the fluid factor, a set of input values (seismic features) at well locations with known fluid factor are inputted into the input layer. The output from the output layer is compared to the known fluid factor at the well locations. The weights and biases at each of the neurons, number of layers, number of neurons in each layer, activation functions, learning rate, batch size, regularization techniques, optimization algorithm and initial method are adjusted to improve the matching between the output and the known fluid factor value for each well location. The training is complete when convergence is reached, that is, when the incremental change in the weights is under a predetermined threshold.

Figure 9:
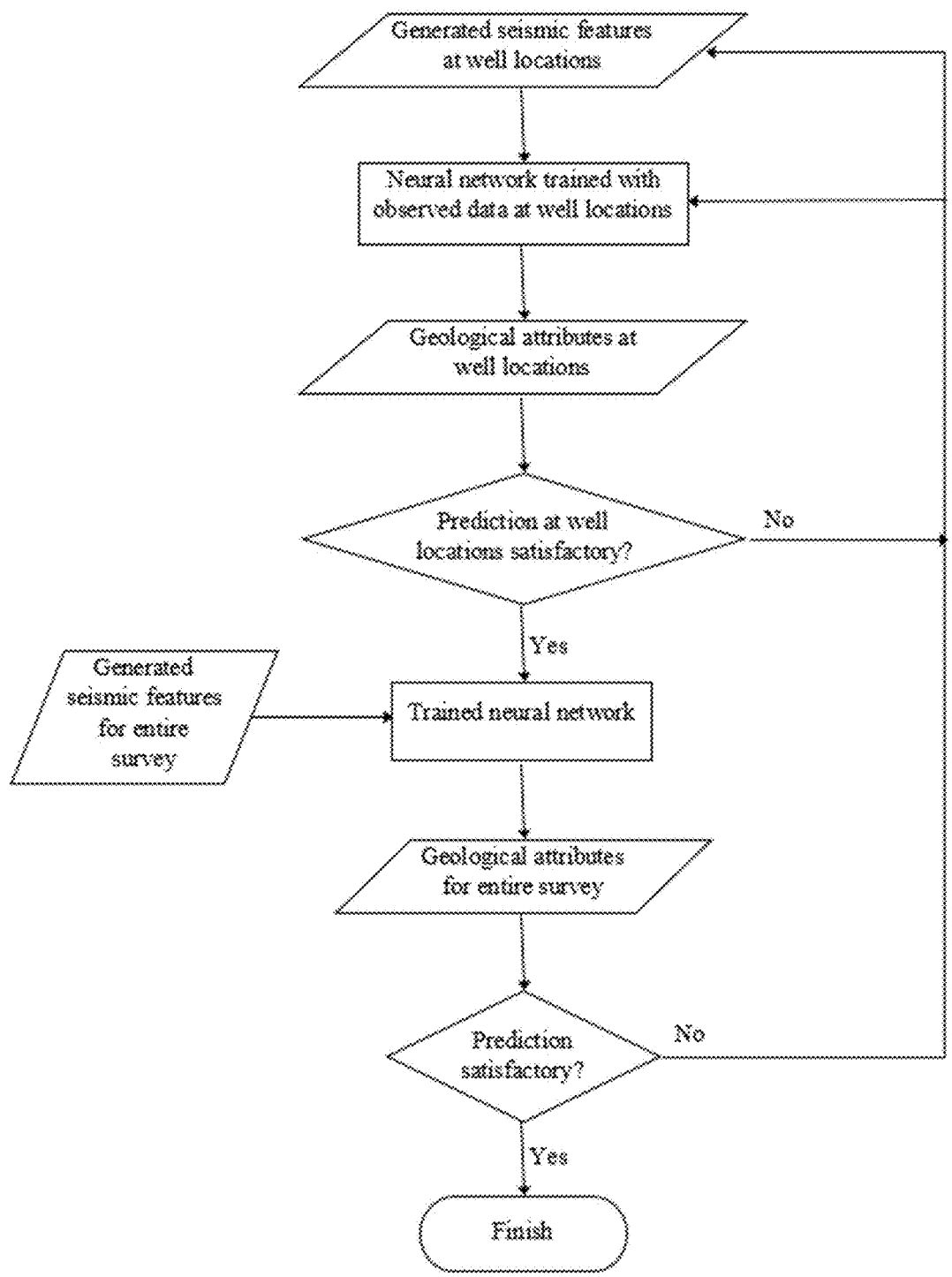
FIG. 9 is a flowchart illustrating the process of calibrating a prestack seismic inversion results.

FIG. 9 is a flowchart illustrating the process of calibrating a prestack seismic inversion results. According to this process, a set of seismic features generated according to the method of FIG. 7 at well locations are inputted into the neural network, which has been trained for the specific set of seismic features as input, to predict the geological attributes at well locations. The prediction is evaluated against the ground truth data at well locations to determine if the prediction is satisfactory. The criteria for evaluation may include the R2 score, Pearson correlation coefficient, root mean square error (RMSE), and mean absolute error (MAE).

If the prediction is inadequate, a second set of seismic features generated according to the method of FIG. 7 can be selected and inputted into a second neural network that has been trained for the second set of seismic features as input. The process iterates until the prediction at well locations is satisfactory.

Once the prediction at well locations is satisfactory, the set of seismic features and corresponding trained neural network are selected for the survey region. The selected set of seismic features generated according to the method of FIG. 7 for the entire survey region can now be inputted into the corresponding trained neural network to predict the geological attributes for the entire survey region. The evaluation criteria for the prediction may include vertical resolution, lateral continuity, and feedback from human experts.

Alternatively, in another embodiment of this disclosure, when the prediction is inadequate either at well locations or for the entire survey region, instead of selecting a new set of seismic features for next iteration, the neural network can be re-trained by selecting a different number of layers and different parameters for the neural network.

The predictions from the calibrated model can be applied for the entire survey region. Optionally, additional volumes of rock and fluid properties such as porosity, permeability, water saturation, sand thickness, resistivity, gamma ray and volume of shale can be generated.

FIGS. 10-14 illustrate the method by using models with strong interbedded thin layers and pronounced lateral heterogeneities at various scales to calibrate the inverted fluid factor and compare the results with the true models. The synthetic model is constructed to simulate the presence of unevenly distributed cavities of various sizes and shapes in karst regions.

Figure 10:
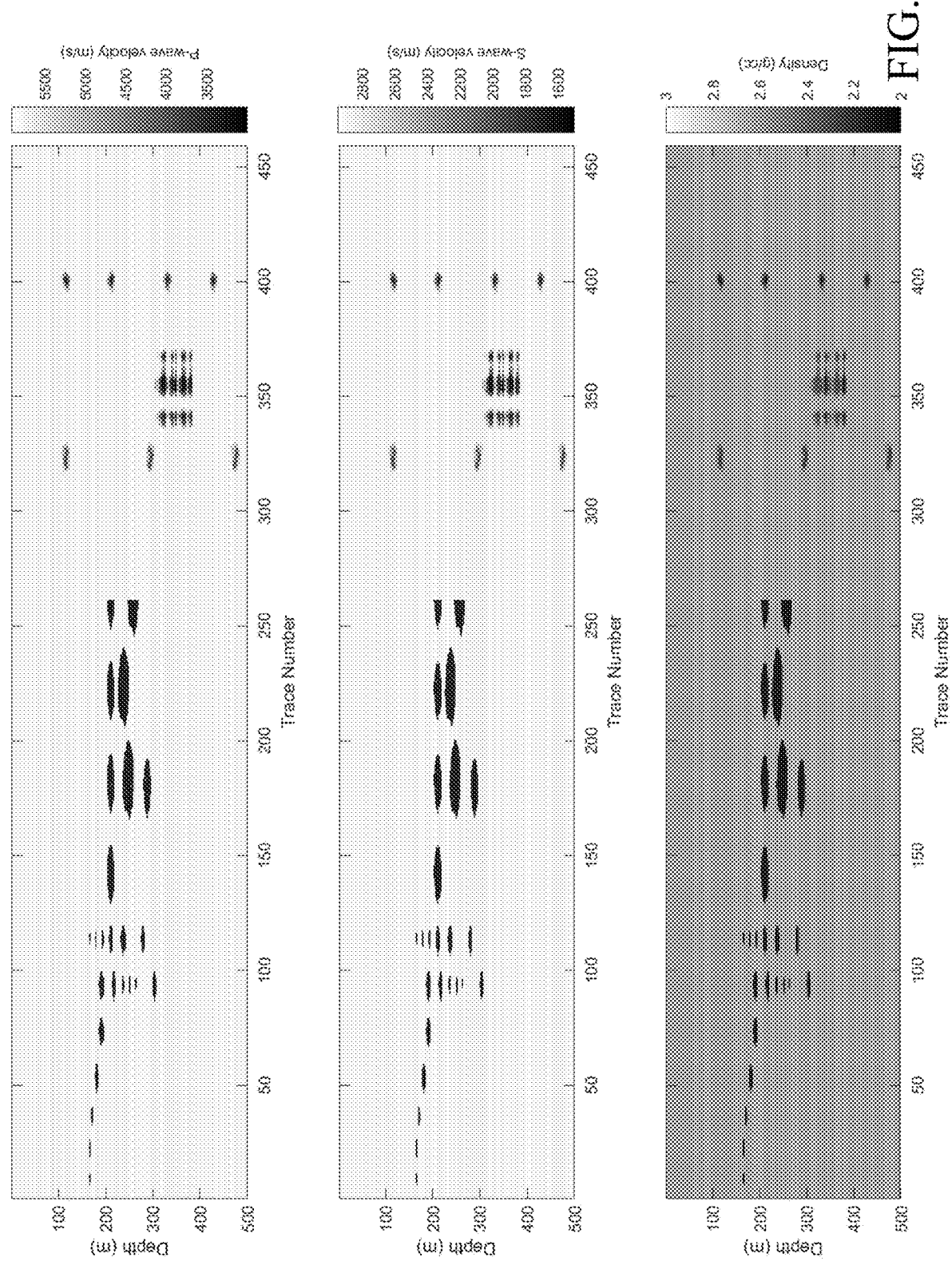
FIG. 10 is a graph illustrating true P-wave velocity, S-wave velocity, and density with high-contrast thin bed layers and lateral heterogeneities.

In FIG. 10, the true elastic models are depicted. P-wave velocity, S-wave velocity, and density exhibit similar anomaly shapes but with slightly different background distributions. Roughly, the vertical resolution for these models varies from 3 meters to 15 meters. Synthetic seismic data is generated using 1-D elastic full wave modeling to simulate amplitude variation with offset (AVO) effects. The wavelet employed is a Ricker wavelet with a dominant frequency of 20 Hz. A ¼ wavelength is approximately 57 meters, and a ⅛ wavelength is approximately 26 meters, both of which exceed the vertical resolution of the true models. This synthetic test is designed to challenge the detection limits of current prestack seismic inversion methods for such a complex geological environment.

Figure 11:
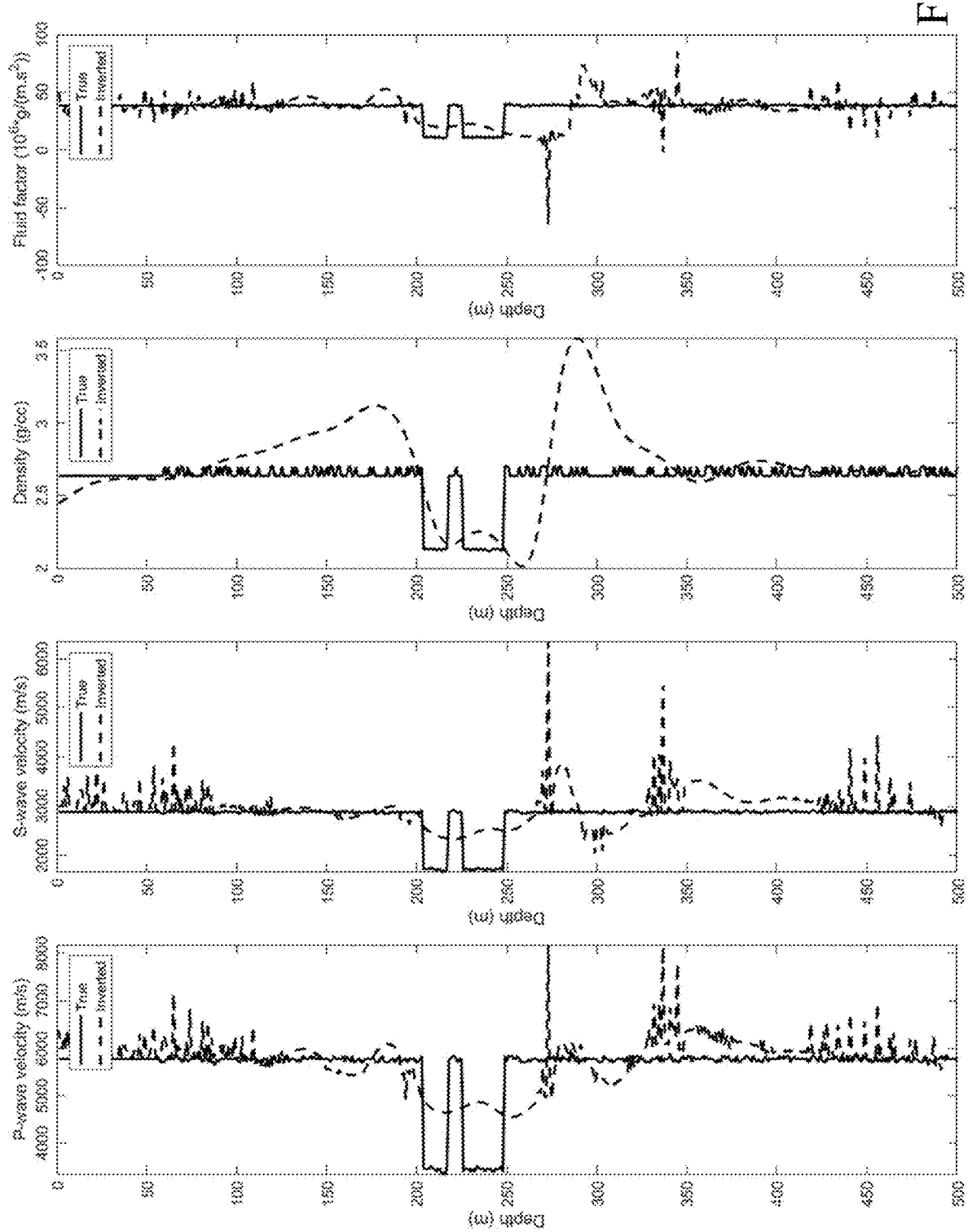
FIG. 11 is a graph illustrating inverted P-wave velocity, S-wave velocity, density, and generated fluid factor for trace number 220.

In FIG. 11, the inverted P-wave velocity, S-wave velocity, density, and calculated fluid factor at trace number 220 are presented. This figure illustrates that, while the existence and approximate location below the surface can be identified from the inverted results, determining the size, actual reservoir properties, and exact locations remains challenging due to the vertical scale of the true model being well below the detection limit of seismic resolution.

Figure 12:
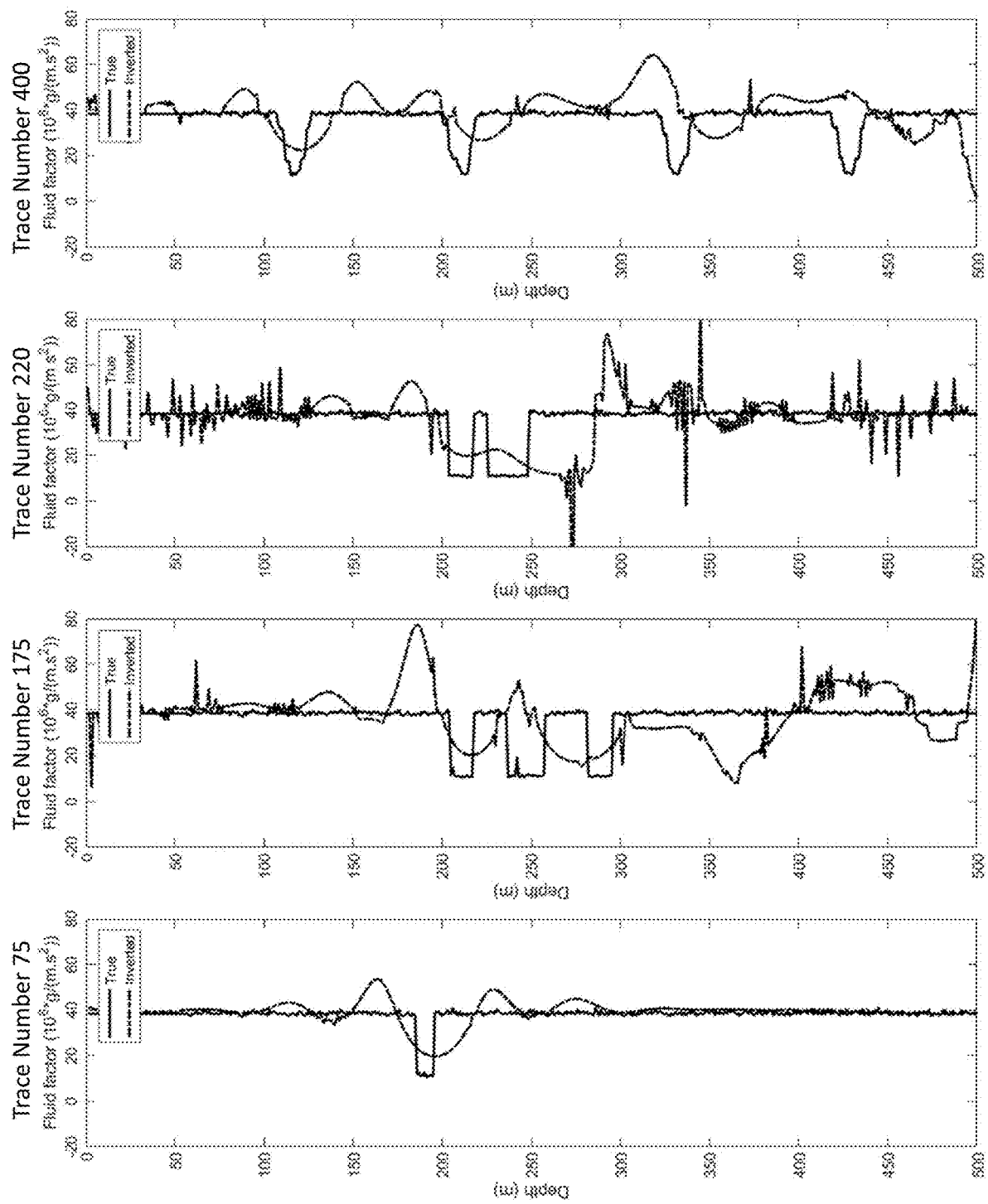
FIG. 12 is a graph illustrating inverted fluid factor at trace numbers 75, 175, 220, and 400 in FIG. 10.

FIG. 12 further demonstrates that the calculated fluid factor from inverted results struggles to accurately delineate the true subsurface geologies at various locations, especially when there is a significant difference in scale and discontinuous distributions. When only one cave is present in the true model, for example, at trace number 75, the fluid factor can roughly capture its shape. However, in scenarios with multiple caves, for example, at trace numbers 175, 220, and 400, the accuracy of the fluid factors decreases, and identifying the shape and number of caves becomes challenging.

Figure 13:
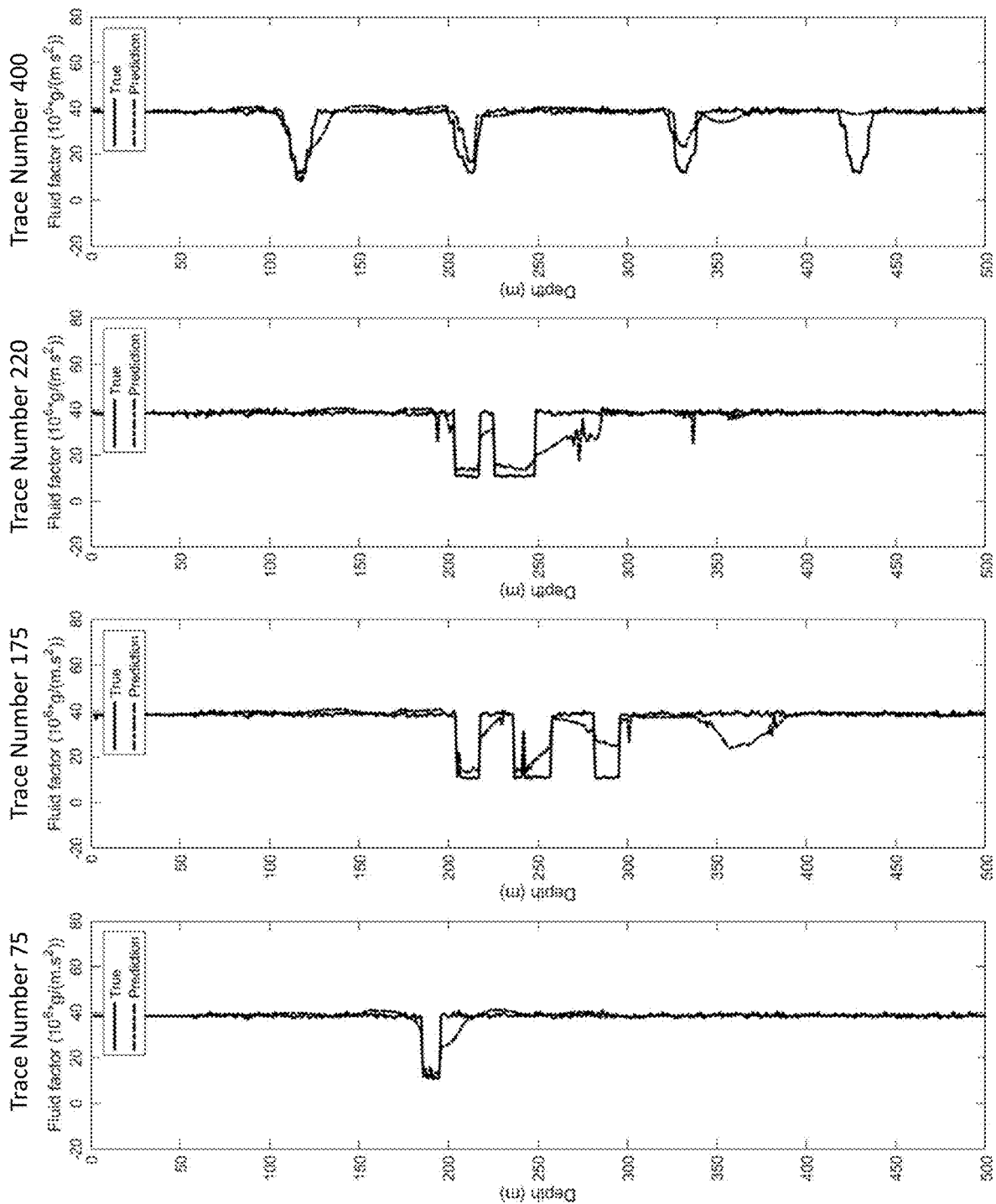
FIG. 13 is a graph illustrating predicted fluid factor using the method described in this disclosure at trace numbers 75, 175, 220, and 400 in FIG. 10.

FIG. 13 reveals that with the neural network-based calibration method, the fluid factor results can be significantly improved. Training is based on ground truth data evenly distributed approximately every tenth of the model. In all scenarios, regardless of the number and size of the caves, both the vertical location and the true values of the fluid factor can be successfully recovered.

Figure 14:
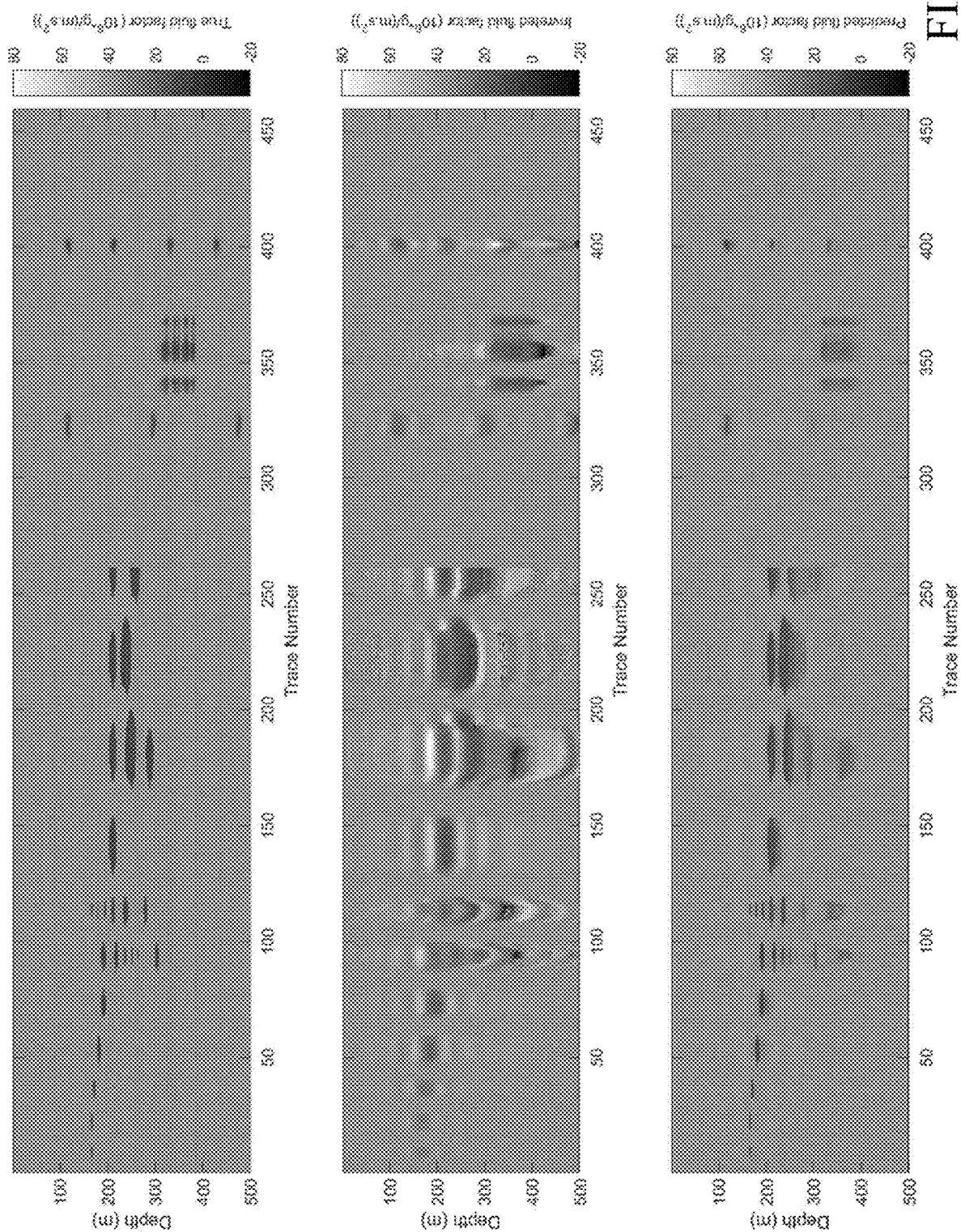
FIG. 14 is a graph illustrating predicted fluid factor and comparing it with inverted fluid factor for all trace numbers in FIG. 10.

FIG. 14 displays the results for the entire model, providing a comprehensive view of the achieved outcomes. In this representation, the method's ability to capture and depict the intricate details of the subsurface geological features becomes evident. Notably, the method excels in capturing both the vertical resolution and lateral heterogeneity of this complex and challenging geological environment. This method can serve as a powerful tool for improving the accuracy of reservoir characterization in complex geological settings, enabling more informed decision-making in the field of seismic exploration and reservoir management.

It would be apparent to a person having ordinary skills in the art that variations of the method and system in the current disclosures are available without departing from the true scope of the disclosure, as defined in the claims set forth below.

What is claimed is:

1. A method for calibrating prestack seismic inversion using fully connected neural networks, the method comprising:
    (a) positioning seismic data recording sensors at a plurality of locations in the survey region and positioning a well logging tool comprising a sonic generator and one or more well log recording sensors in a well bore in the survey region;
    (b) emitting at points of incidence in the survey region to generate seismic waves, which travel through subsurface earth formations;
    (c) observing the seismic waves and recording seismic data based on the seismic waves using the seismic data recording sensors;
    (d) conducting well logging operation using the well logging tool and recording well log data using the one or more well log recording sensors;
    (e) transmitting the seismic data from the seismic data recording sensors and the well log data from the one or more well log recording sensors to a computer system including one or more memories and storing the seismic data and the well log data in the one or more memories;
    (f) processing the seismic data and the well log data to obtain an estimated wavelet and to identify one or more horizons;
    (g) obtaining one or more prestack inverted geological models by combining the seismic data, the well log data, the one or more horizons, the estimated wavelet, and an initial model;
    (h) calculating target reservoir attributes by combining the one or more prestack inverted geological models;
    (i) generating features from the target reservoir attributes and, and/or from one or more additional attributes and additional data types;
    (j) defining a neural network model having a plurality of layers, each layer having a plurality of parameters;
    (k) training the neural network model and evaluating output from the neural network model at well locations across the survey region; and
    (l) applying calibrated model's predictions for the entire survey region and optionally generating additional volumes of rock and fluid properties.

2. The method of claim 1, wherein, in step (g), the one or more prestack inverted geological models is obtained by a method selected from elastic wave equation inversion, model-based inversion, stochastic inversion, and sparse spike inversion.

3. The method of claim 1, wherein the one or more inverted geological models is selected from a P-wave velocity model, an S-wave velocity model, a density model, and a combination thereof.

4. The method of claim 1, wherein, in step (i), the additional data types are one or more selected from seismic data, well log data, horizons, estimated wavelet, and initial model are within the same survey region.

5. The method of claim 1, wherein, in step (i), the additional attributes are one or more selected from inline location, crossline location, two-way travel time, depth, horizons, topography, and tidal data.

6. The method of claim 1, wherein target reservoir attributes is one or more selected from P-wave velocity, S-wave velocity, density, Poisson impedance, P-wave to S-wave velocity ratio $v_p/v_s$, and fluid indicator.

7. The method of claim 1, wherein the features extracted from target geological attributes are selected from amplitude, amplitude envelope, amplitude weighted frequency, amplitude weighted phase, average frequency, apparent polarity, cosine instantaneous phase, derivative of seismic data, derivative instantaneous amplitude, dominant frequency, instantaneous frequency, instantaneous phase, integrated absolute amplitude, and mixtures thereof.

8. The method of claim 1, wherein, in step (k), the neural network is trained using a regression architecture, where the ground truth data consists of a set of continuous measurements.

9. The method of claim 8, wherein parameters for the fully connected neural network include weights and biases, number of layers, number of neurons in each layer, activation functions, learning rate, batch size, regularization techniques, optimization algorithm and initialization method.

10. The method of claim 1, wherein criteria for the model evaluation is one or more selected from R2 score, root mean square error (RMSE), mean absolute error (MAE) at well locations, vertical resolution, and lateral continuity.

11. The method of claim 1, optional additional volumes of rock and fluid properties include porosity, permeability, water saturation, sand thickness, resistivity, gamma ray and volume of shale.

* * * * *